Patented May 9, 1950

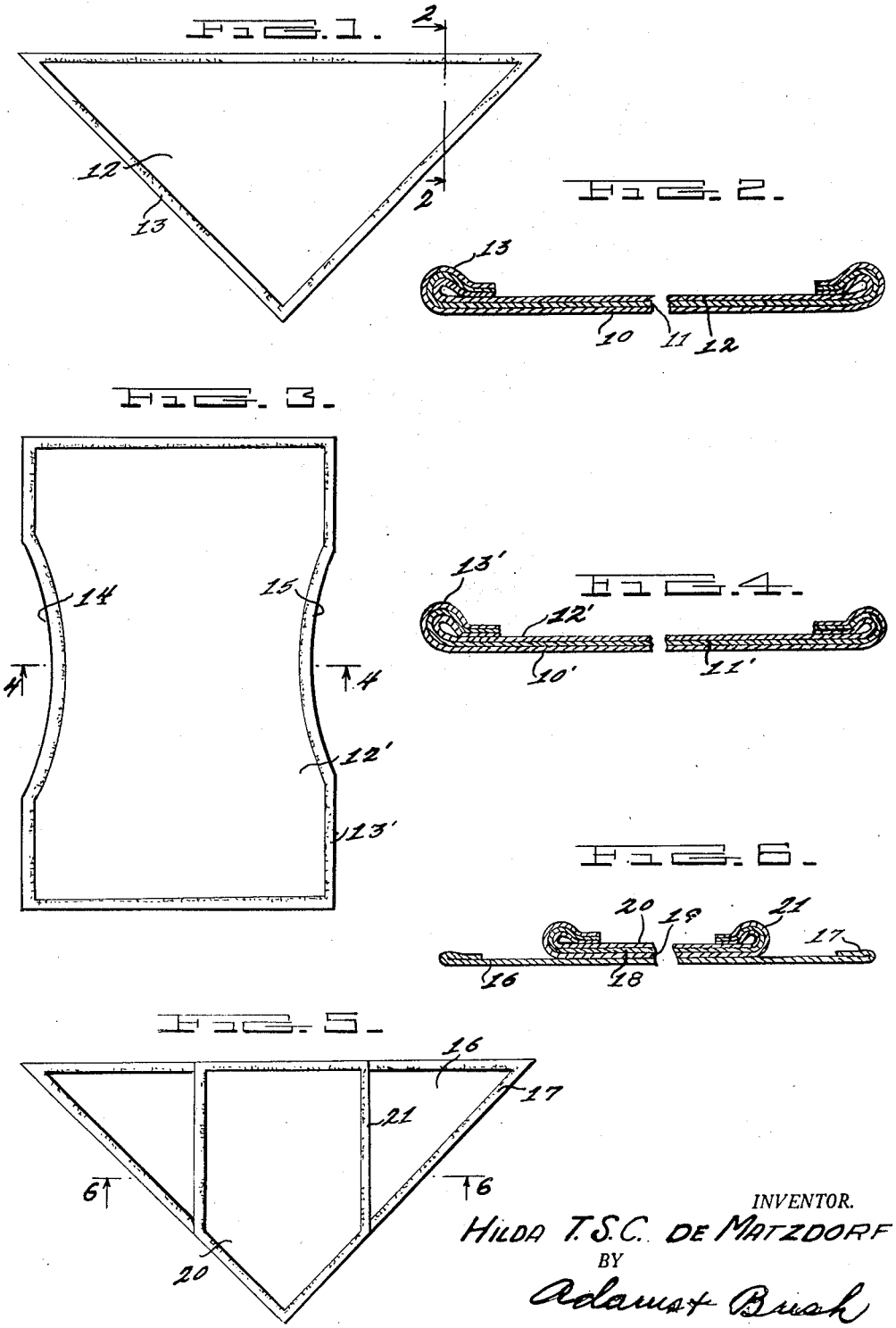

2,507,197

UNITED STATES PATENT OFFICE 2,507,197

DIAPER

Hilda Tischler Santa Cruz de Matzdorf,
Guatemala, Guatemala

Application July 7, 1948, Serial No. 37,393

3 Claims. (Cl. 128—287)

This invention relates to diapers and has more particular reference to disposable diapers of the type designed to be discarded after being used once.

One object of the invention is to provide a disposable diaper comprising a bottom layer of water-proofed material and one or more coextensive layers of absorbent material secured to the water-proof layer and having a water-proofed beading formed around the peripheral edges of the diaper.

Another object of the invention is to provide a disposable diaper, as above characterized, wherein the area of the diaper bounded by the water-proofed beading is confined to substantially the central portion of the diaper.

Another object of the invention is to provide a disposable diaper which is simple in construction, economical in manufacture, yet practical and efficient in use.

Other objects and advantages of the invention will become apparent from the following specification, when considered in connection with the accompanying drawing, wherein:

Fig. 1 is a plan view of a diaper constructed in accordance with the present invention;

Fig. 2 is a sectional view taken on line 2—2 of Fig. 1;

Fig. 3 is a plan view of a modified form of diaper;

Fig. 4 is a sectional view taken on line 4—4 of Fig. 3;

Fig. 5 is a plan view of a second modified form of diaper; and

Fig. 6 is a sectional view taken on the line 6—6 of Fig. 5.

Referring now to the drawing, there is shown, in Figs. 1 and 2, one form of a diaper constructed in accordance with the present invention. As there shown, the diaper comprises a triangular shaped layer of flexible water-proofed material 10, which forms the outer layer of the diaper; two triangular shaped inner layer of soft flexible absorbent material 11, 12, coextensive in area with the outer layer of water-proofed material; and a peripheral water-proofed beading 13.

The outer layer of material 10 may be made of any suitable soft, flexible material, preferably a cellulose material such as paper or paper cotton. This layer is water-proofed by being coated, on one or both sides, with any suitable water-proofing material, such as liquid paraffin or the like, which, in addition to its water-proofing qualities, acts as an adhesive to secure to itself the superimposed layer 12 of absorbent material. The layers of absorbent material 11, 12 are made of any suitable soft, absorbent bibulous material such as cotton batting or the like. While two such layers of absorbent material are shown, obviously, any number of such layers may be employed. However, I have found that a diaper having an overall thickness of ½ centimeter is completely satisfactory and avoids bulkiness.

The layer of absorbent material 12 which is superimposed on the water-proofed layer 10, is secured thereto by the water-proofing material and any additional layers of absorbent material are sufficiently secured to each other by the interlocking of the fibers of the material of the layers.

In order to prevent the escape of any moisture or excreta from around the edges of the diaper, a water-proofed beading is formed around the edges of the diaper. In the particular embodiment shown, the peripheral edges of the superimposed layers 10, 11 and 12 are turned inwardly and secured, as by pressing with a hot iron, or, as shown, by crimping. This produces a beading 13, which is water-proofed, due to its outer layer being formed by the water-proofed layer 10. (See Fig. 2.) In addition to preventing the escape of moisture and excreta from the edges of the diaper, the beading 13 helps maintain the layers 10, 11 and 12 in their secured-together position and add strength to the diaper structure.

A diaper constructed as above described provides an inner surface of soft absorbent material for contacting the baby's skin and absorbing moisture; an outer water-proofed covering which prevents the moisture from leaking through the diaper; and a water-proofed beading which engages the baby's skin and prevents any moisture or excreta from escaping around the edges of the diaper.

As aforesaid, the diaper of the invention is designed to be disposed of after one use and, preferably, is designed as an adjunct to be used with the conventional cloth diaper, which holds it in place. Obviously, it can be secured on the body of the infant in the same manner as the conventional cloth diaper, as by the use of safety pins or the like, if desired. The water-proofed material and the layers of absorbent material, with the peripheral beading, have sufficient strength for this purpose.

In Figs. 3 and 4, there is shown a modified form of diaper. This diaper is identical in construction to the diaper shown in Figs. 1 and 2, except in outline. As shown, the diaper comprises an outer layer of water-proofed material 10'; two superimposed layers of absorbent material 11', 12', and a peripheral water-proofed beading 13'. All of the layers are coextensive in size and shape, and, as shown, are substantially rectangular in outline and are provided with semicircular opposing cut outs 14, 15, on opposite sides of the diaper, adapted to fit the legs of the baby. The various layers of material in this modification are preferably made of the same material as the corresponding layers of the modification shown in Figs. 1 and 2, and, preferably, the beading 13' is made in a manner similar to that in which the beading 13 is made.

In Figs. 5 and 6, there is shown a second modified form of a diaper constructed in accordance with the present invention. As there shown, the diaper comprises an outer triangular shaped layer of flexible water-proofed material 16 having a peripheral beading 17; a small triangular shaped inner layer of flexible, water-proofed material 18 superimposed on the layer 16; and two layers of absorbent material 19, 20 coextensive in size and shape with and superimposed upon the water-proofed layer 18; and a water-proofed beading 21 formed by inturning the peripheral edges of the superimposed layers 18, 19 and 20, and securing them in their infolded position, preferably by crimping. The superimposed water-proofed layers 16, 18 are held together by the water-proofing material. The absorbent layer 19 is secured to the inner water-proofed layer 18 by the water-proofing material, and the absorbent layer 20 is secured to the absorbent layer 19 by interlocking of the fibers of the material of which the layers are made, and the assembled layers held together by the beading 21. The various layers of material in this modification are preferably made of the same material as the corresponding layers of the modification shown in Figs. 1 and 2.

From the foregoing, it readily will be seen that there has been provided a disposable diaper which is simple and economical in construction and one which is extremely efficient in use. The water-proofed beading around the peripheral edges of the diaper will completely prevent any moisture or excreta from escaping around the edges of the diaper. The absorbent layers will absorb any moisture; and the outer water-proofed layer will prevent the leakage of any moisture through the diaper.

Obviously, the outer water-proofed layer may be made of any suitable flexible, water-proofed material, including "cellophane" or other flexible plastic materials, or, if desired, the outer surface of the bottom layer of absorbent material may be coated with water-proofing material such as liquid paraffin to form the water-proofed outer layer.

Having thus described the invention, what is claimed is:

1. A new article of manufacture, comprising a disposable diaper composed of an outer layer of water-proofed material, at least one inner layer of soft absorbent material coextensive with said outer layer, said layers having their marginal edges inturned and secured to the body of the diaper to form a reinforcing bead which holds the two layers together, prevents the escape of moisture and excreta, and prevents tearing of the diaper.

2. A disposable diaper comprising an outer flexible layer of thin paper coated with water-proofing material; an inner coextensive layer of soft absorbent material superposed on said outer layer and secured thereto by said water-proofing material; said layers having their marginal edges inturned and secured to the body of the diaper to provide a reinforcing water-proof bead to prevent the escape of moisture and excreta and to prevent tearing.

3. A disposable diaper, as set forth in claim 1, wherein said inner layer is composed of at least two sheets of soft cotton batting secured together by interlocking fibers.

HILDA TISCHLER SANTA CRUZ DE MATZDORF.

REFERENCES CITED

The following references are of record in the file of this patent:

UNITED STATES PATENTS

| Number | Name | Date |
| --- | --- | --- |
| Re. 18,468 | Schwartz | May 17, 1932 |
| 318,141 | Samuel | May 19, 1885 |
| 342,043 | Samuel | May 18, 1886 |
| 2,009,310 | Dendoff | July 23, 1935 |
| 2,122,417 | Fridolph | July 5, 1938 |

FOREIGN PATENTS

| Number | Country | Date |
| --- | --- | --- |
| 216,275 | Great Britain | May 29, 1924 |